United States Patent [19]
Doyle et al.

[11] 3,949,362
[45] Apr. 6, 1976

[54] MOTOR VEHICLE STOPPING DISTANCE WARNING APPARATUS AND METHOD

[76] Inventors: Earl N. Doyle, 1737 Campbell Road; Xavier Garza, 2301 Wirt Road, both of Houston, Tex. 77055

[22] Filed: June 6, 1974

[21] Appl. No.: 477,032

[52] U.S. Cl. ............................. 340/104; 340/62
[51] Int. Cl.² ..................... B60K 27/00; B60Q 1/00
[58] Field of Search .......... 340/34, 104, 258 R, 258, 340/62; 40/129 C

[56] References Cited
UNITED STATES PATENTS

| | | | |
|---|---|---|---|
| 2,158,310 | 5/1939 | Smith et al. | 40/129 C |
| 2,804,160 | 8/1957 | Rashid | 340/34 UX |
| 2,831,182 | 4/1958 | Kamins | 340/258 R |
| 2,896,089 | 7/1959 | Wesch | 340/34 X |
| 2,974,304 | 3/1961 | Nordlund | 340/34 X |
| 3,749,197 | 7/1973 | Deutsch | 340/104 X |
| 3,786,507 | 1/1974 | Hurd, Jr. | 340/104 X |

Primary Examiner—Donald J. Yusko
Attorney, Agent, or Firm—Burns, Doane, Swecker & Mathis

[57] ABSTRACT

A warning system and methods for vehicles traveling in tandem. A signal beam of energy is emitted from a leading vehicle and is directed toward the roadway to indicate a safe stopping distance. The signal beam is automatically displaced in response to changes in vehicle speed to indicate a new safe stopping distance. The signal emitter may comprise a lamp for emitting a visible light beam. A signal detector may be provided on the trailing vehicle to detect the energy beam from the leading vehicle.

9 Claims, 14 Drawing Figures

MOTOR VEHICLE STOPPING DISTANCE WARNING APPARATUS AND METHOD

BACKGROUND AND OBJECTS OF THE INVENTION

This invention relates to motor vehicle warning systems and, more particularly, to methods and apparatus involving the emitting of a signal beam from a vehicle to indicate a safe stopping distance relative to a vehicle traveling in tandem therewith.

With an increasing number of automobiles being in use on the world's highways, the occurrence of highway collisions and collision-related injuries continues to rise. Many accidents involve a rear-end collision wherein a lead vehicle is impacted from behind by a trailing vehicle. One major contributing cause of such rear-end collisions is the tendency for the trailing vehicle to travel too closely behind the lead vehicle, often referred to as "tail-gating". As a result, the trailing vehicle is unable to be sufficiently slowed or stopped in emergency situations.

Although such tailgating is often performed intentionally by reckless drivers, it can also be done unintentionally by careless drivers who do not realize the hazzards presented. The absence of any means for warning drivers that they are following too close results in the continuance of this dangerous habit.

Techniques for warning a trailing vehicle that it is following too closely behind a lead vehicle have been heretofore proposed. For example, U.S. Lusebrink Pat. No. 3,571,790 discloses a warning system wherein a light is carried by a motor vehicle and is operable to display to other vehicles a differently colored light in accordance with the speed of the carrying vehicle. Apparatus of this type, besides requiring use of a relatively large and complex lens system, may prove confusing to drivers who have limited color distinguishing ability.

It is an object of the invention to avoid or alleviate disadvantages associated with previously proposed warning systems.

It is another object of the invention to provide novel methods and apparatus for warning drivers when their vehicles are traveling too close to a tandemly traveling vehicle.

It is another object of the invention to provide such novel vehicle warning methods and apparatus which provide a clear warning without the need for distinguishing colors.

It is a further object of the invention to provide such novel methods and apparatus for regulating the warning signal in accordance with vehicle speed.

It is yet another object of the invention to provide such methods and apparatus that are easily and economically adaptable to presently available automobiles.

SUMMARY OF THE PREFERRED EMBODIMENTS OF THE INVENTION

A preferred form of the invention intended to accomplish at least some of the foregoing objects entails a vehicle warning system which comprises a signal mechanism and a signal detector mechanism which are respectively disposed on first and second vehicles traveling in tandem. The signal mechanism comprises a signal producer on the first vehicle for generating a signal beam. The signal producer includes means for directing the signal beam at an inclined angle toward a roadway portion so as to indicate a safe stopping distance between the vehicles. The signal beam is operable to actuate the signal detector mechanism when the vehicles are close enough for the signal detector mechanism to sense the signal beam. Also provided is a control mechanism which is responsive to changes in the speed of the first vehicle for displacing the signal beam in accordance with the changes in vehicle speed. Once dsplaced, the signal beam indicates a safe stopping distance between the vehicles in accordance with the changed speed of the first vehicle.

In an independently significant aspect of the invention, the signal producer includes a lamp which generates a beam of light. The beam of light is directed toward the roadway portion to establish a visible light pattern which is indicative of a safe stopping distance. A control mechanism responds to changes in the speed of the first vehicle to displace the light beam to visibly indicate a new safe stopping distance in accordance with the speed change.

Steps associated with the operation of the previously discussed apparatus constitute further independently significant method aspects of the present invention.

THE DRAWINGS

Other objects and advantages of the present invention will become apparent in the subsequent detailed description thereof in connection with the accompanying drawings in which like numerals designate like elements, and in which.

DETAILED DESCRIPTION OF THE PREFERRED EMBODIMENTS

Figure 1:
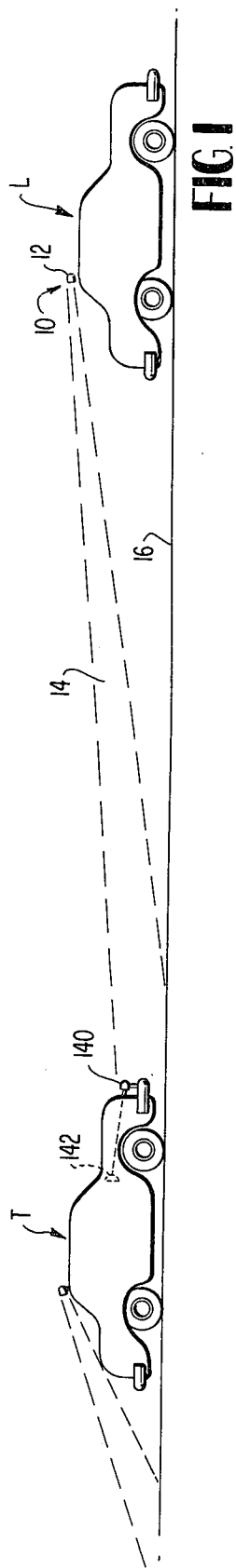
FIG. 1 is a schematic illustration of the present invention in relation to a pair of vehicles traveling in tandem.

FIG. 1 discloses a pair of vehicles L, T traveling tandemly relative to one another, i.e. in leading and trailing fashion. The lead vehicle L is provided with a signalling mechanism 10 which includes a lamp 12. The lamp 12 is attached to the body of the lead vehicle L and is oriented to direct a beam of light 14 rearwardly and downwardly toward the roadway 16 behind the lead vehicle L. The lamp 12 emits a high intensity light beam to produce a highly visible light pattern on the roadway. A strobe, quartz, or mercury lamp, for example, could be used to accomplish this.

The light pattern is disposed behind the lead vehicle at a prescribed distance, depending upon the inclination of the beam 14, to be indicative of a safe stopping distance between the leading and trailing vehicles. The safe stopping distance can be chosen in accordance with known safety standards such as those suggested by federal and state highway departments.

The light pattern is visible to the driver of the trailing vehicle T who will be readily aware when he is travelling too close to the lead vehicle. That is, when the light pattern falls upon the hood of the trailing vehicle T or impinges directly in the trailing driver's vision so as to produce a glare, the trailing driver will realize that he is traveling at the borderline of the safe stopping range.

Since the magnitude of the safe stopping distance fluctuates with vehicle speed, it is preferable that the angle of inclination of the light beam 14 be automatically adjustable in accordance with the speed of the vehicles. In order to approximate this, the lamp 12 is rendered automatically adjustable in accordance with the speed of the vehicle carrying the lamp 12. In this fashion, the changes in safe stopping distance occurring as a function of vehicle speed will be automatically indicated.

Figure 4:
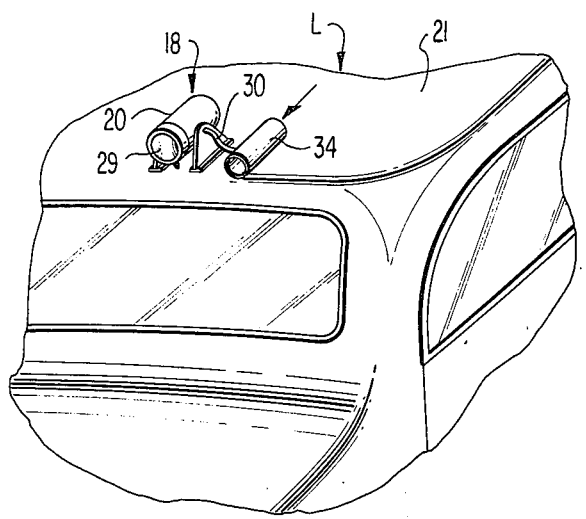
FIG. 4 is a fragmentary illustration, in perspective, of a vehicle carrying a signal producing mechanism mounted in accordance with one form of the invention.
Figure 5:
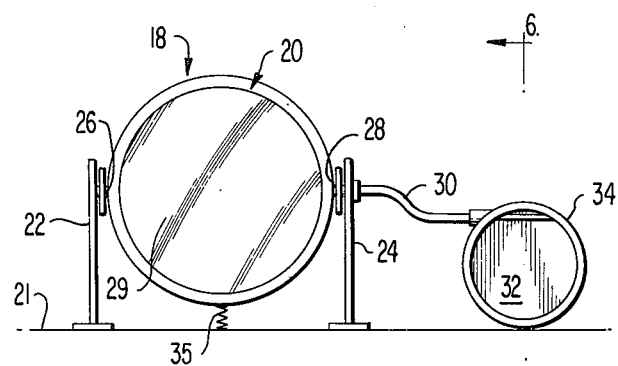
FIG. 5 is a view of the mechanism depicted in FIG. 4 taken from the rear of the vehicle.
Figure 6:
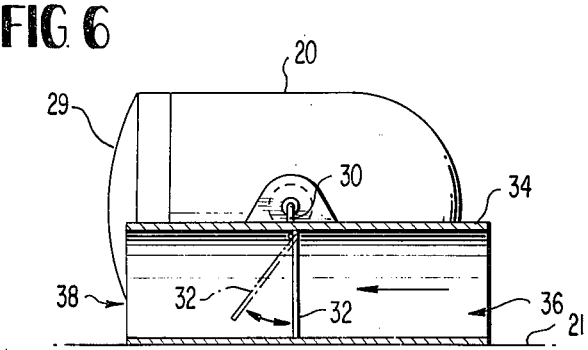
FIG. 6 is a longitudinal sectional view taken along line 10-10 of FIG. 5.

One suitable form of signal speed sensitive signal assembly is illustrated in FIGS. 4–6. The signal assembly 18 therein disclosed includes a lamp 20 which is rotatably mounted on the roof 21 of the vehicle L between a pair of brackets 22, 24 by a pair of pivot pins 26, 28. The lamp 20 is arranged such that the lens portion 29 thereof, which directs the beam, faces rearwardly of the vehicle. One of the pivot pins 28 is fixedly coupled to, or is an extension of, a Bourdon wire 30. At its remote end, the Bourdon wire 30 is attached to a vane 32 which is movably disposed within a wind tube 34. The wind tube 34 is arranged on the roof 21 in a fore and aft direction relative to vehicle movement. The front and rear ends 36, 38 of the tube 34 are open, with the front end facing the front of the vehicle L. When the vehicle L is in motion, air passing through the tube 34 impinges upon the vane 32. A spring 35 connected between the vehicle L and the lamp 20 biases the lens portion 29 downwardly.

Depending upon the intensity of the air traveling through the tube, the intensity being a function of vehicle speed, the vane is angularly displaced in a manner causing simultaneous torsional movement of the Bourdon wire 30. The connection between the Bourdon wire 30 and the lamp 20 produces corresponding angular rotation of the lamp. It will be apparent that as the speed of the vehicle increases, the intensity of air passing through the tube will increase. The resulting increase in force applied to the vane 32 will swivel the vane 34 rearwardly, thereby pivoting the lens portion 29 of the lamp upwardly, i.e. clockwise as viewed in FIG. 6, against the bias of the spring 35. In this manner, the distance behind the vehicle L at which the visible light pattern is produced on the roadbed is increased. When vehicle speed is reduced, the lamp 20 will assume a lower position. The arrangement of the vane 34 and the lamp 20 may be correlated so as to produce a predetermined lamp rotation in response to a given change in vehicle speed. It is understood that naturally occurring changes in air speed, independent of vehicle speed changes, will influence the position of the lens 29. As a result, it should be appreciated that movements of the lens 29 by one vane 32 will be indicative of approximate changes in vehicle speed.

The spring 35 could be mounted for adjustment of its strength to provide compensation for wind. In other words, on a windy day, the spring could be pre-tightened by an amount corresponding to wind-induced deflection of the lamp.

Figure 7:
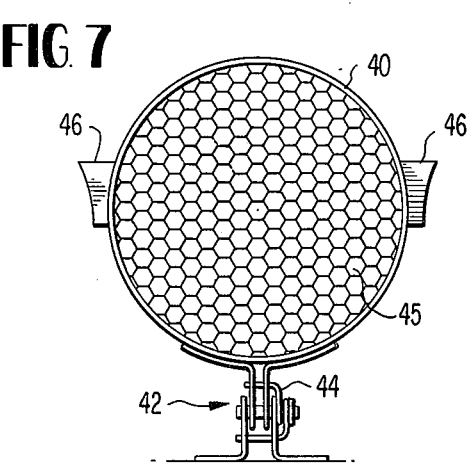
FIG. 7 is a view of another vehicle-mounted embodiment of the invention as viewed from the rear of a vehicle.
Figure 8:
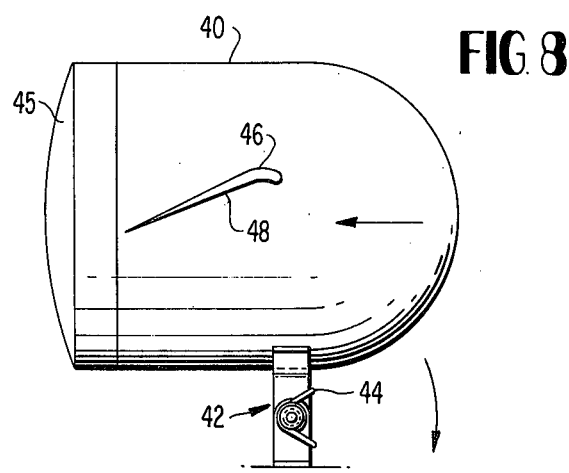
FIG. 8 is a side view of the mechanism depicted in FIG. 7.

An alternate form of speed responsive signal lamp is illustrated in FIGS. 7 and 8. In this embodiment, a lamp 40 is pivotally mounted to a bracketed assembly 42 mounted on the roof of the vehicle L. A torsion spring 44 biases the lamp downwardly. The lamp is oriented such that the lens 45 thereof faces rearwardly of the vehicle. A pair of vanes 46 are fixedly attached to the housing of the lamp 40 and are inclined in such a manner that wind which impinges against the under surfaces 48 thereof rotates the lamp such that the lens portion 45 thereof swings upwardly. Thus, as the vehicle L increases its speed, the location where the light pattern projects onto the roadway will be displaced further rearwardly.

It will be apparent that the effectiveness of the vehicle warning systems described above will be greatest during the darker periods of the day when the light pattern is most highly visible.

In addition to the rearwardly aimed signal lamps discussed previously, motor vehicles could also carry a forwardly aimed signal lamp. Such a forwardly aimed lamp would project a light pattern on the roadway ahead of the vehicle carrying the lamp to indicate a safe stopping distance. In this fashion, the driver of the carrier vehicle will be aware of the safe stopping distance even if a vehicle ahead of him is not equipped with a rearwardly aimed light emitter. Thus, when the pattern strikes the lead vehicle, the driver of the carrier vehicle will be warned that he should follow no closer. Based on the principles previously discussed and to be subsequently disclosed the forwardly projecting lamp could be arranged for automatic displacement in accordance with vehicle speed. In such an arrangement, speed increases would serve to raise the lens.

Figure 2:
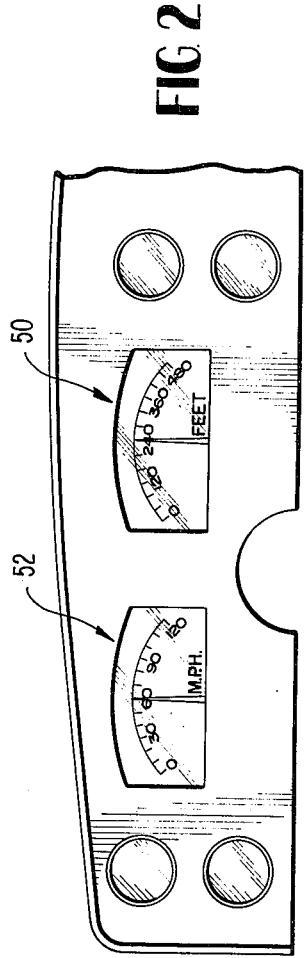
FIG. 2 is a fragmentary view of a vehicle dashboard associated with a preferred embodiment of the invention.

In addition to, or in lieu of, a forwardly aimed signal lamp, a vehicle could be equipped with a gauge for indicating a safe stopping distance. FIG. 2 depicts such a gauge 50 which can be located on the vehicle dashboard. The gauge 50 is operatively connected to the mechanism operating the speedometer 52 such that changes in vehicle speed produce a fluctuation in the distance gauge 50. In this fashion, the driver of the vehicle is provided with a fairly accurate indication of the distance required to stop his vehicle and he may react accordingly.

Figure 9:
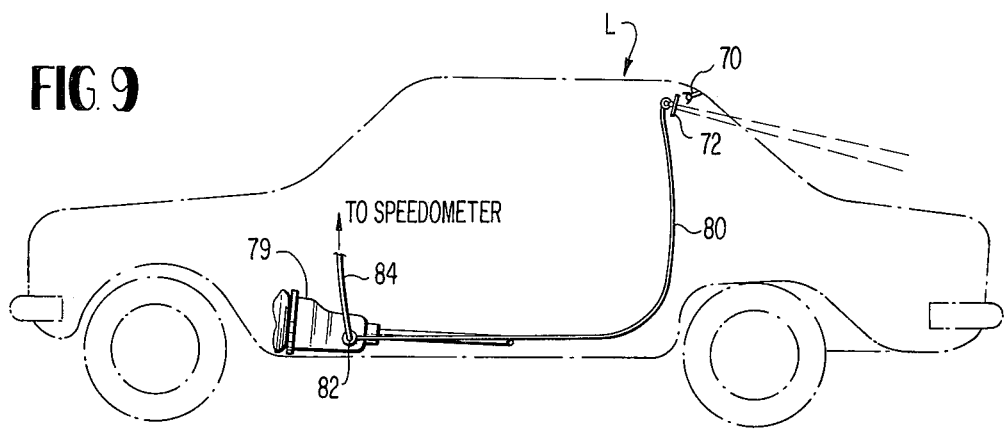
FIG. 9 is a schematic illustration of one preferred form of speed sensing mechanism according to the invention.
Figure 10:
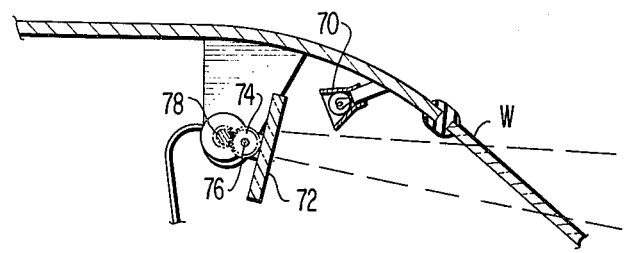
FIG. 10 is an enlargement of a fragmentary portion of the mechanism depicted in FIG. 9 illustrating another form of signal producing mechanism according to the invention.

FIGS. 9–14 depict other systems for displacing the signal beam in response to changes in vehicle speed. Attention is directed to FIGS. 9 and 10 illustrating a system which senses speed changes at the vehicle power train. A signal lamp 70 is mounted adjacent the rear window of a vehicle L and is oriented so as to project a beam of light onto a reflective element 72. The reflective element is mounted on a gear 74 which rotates about an axis 76. The reflective element is arranged to reflect the light beam rearwardly through the back window W of the vehicle. A driver gear 78 meshes with the gear 74. The drive gear 78 is operably connected to the vehicle transmission 79 to be operated in the same manner as a conventional speedometer. Thus, a flexible cable 80 is connected to the driven generator 82, the latter being of conventional construction to normally drive the speedometer cable 84. Rotation of the flexible cable 80 is transmitted to the drive gear 78 by a magnetically responsive mechanism conventionally employed to drive speedometer gauges. Therefore, changes in speed of the vehicle will produce rotation of the speedometer dial and, in the same manner, rotation of the reflective element 72 to increase the distance behind the vehicle at which the light is projected onto the roadway. It will be apparent that the relative sizes of the gears 78, 74 may be designed to produce a desired amount of deflection of the reflective element 72 for a given quantitative change in vehicle speed.

Figure 11:
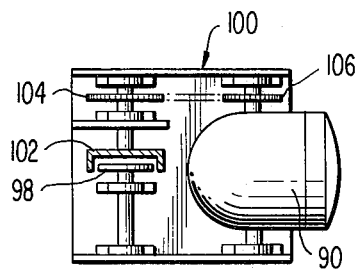
FIG. 11 is a plan view, with parts broken away, of another form of speed sensing mechanism according to the invention.
Figure 12:
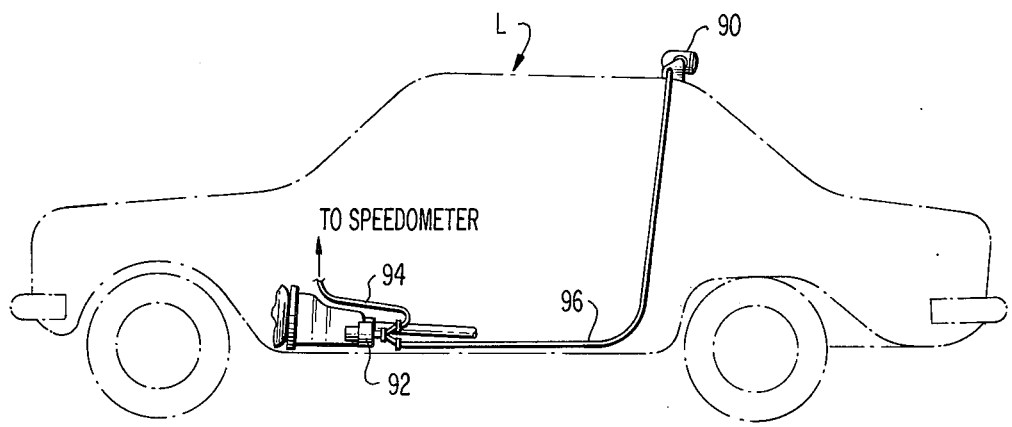
FIG. 12 is a schematic view of a vehicle carrying the speed sensing mechanism depicted in FIG. 11.

Another embodiment of the invention, depicted in FIGS. 11 and 12, relates to the automatic operation of a lamp 90 which is pivotally mounted to a bracket arrangement on the roof of a vehicle L. As in the systems disclosed in conjunction with FIGS. 9 and 10, the lamp 90 is rotated by a generator 92 which is operably coupled to the speedometer cable 94. A cable 96 is driven by the generator 92 and is connected to a rotatable magnet 98 (FIG. 11). The magnet 98 forms parts of a conventional magnetic control assembly 100 for pivoting the lamp 90 and could be used for rotating the reflective element 72 of FIG. 10 previously discussed.

The magnetic control assembly 100 is of the type generally utilized to operate speedometer gauges. The assembly includes a cup-shaped plate 102 in which the magnet 98 rotates. The plate 102 may be rotatably advanced within a given range and is spring biased against such advancement. The plate 102 is coupled to a sprocket wheel 104 which is connected by an endless chain to a gear 106. The gear 106 is connected to the lamp 90. When the vehicle L is in motion, the generator 92 rotates the flexible cable 96 through a suitable gearing arrangement. The cable 96 rotates the magnet 98. As the magnet 98 rotates, it magnetic field applies a magnetic torquing force to the plate 102 in the conventional fashion. This force tends to rotatably displace the plate 102 against the bias of its spring, the amount of displacement being in accordance with the relative magnitudes of the torquing force and the spring bias force. Displacement of the plate 102 is transmitted to the lamp 90 to change the angle at which the signal beam is projected toward the roadbed. As vehicle speed increases, the torquing force increases, thereby further displacing the lamp 90 and increasing the safe stopping distance indicated by the signal beam.

Figure 13:
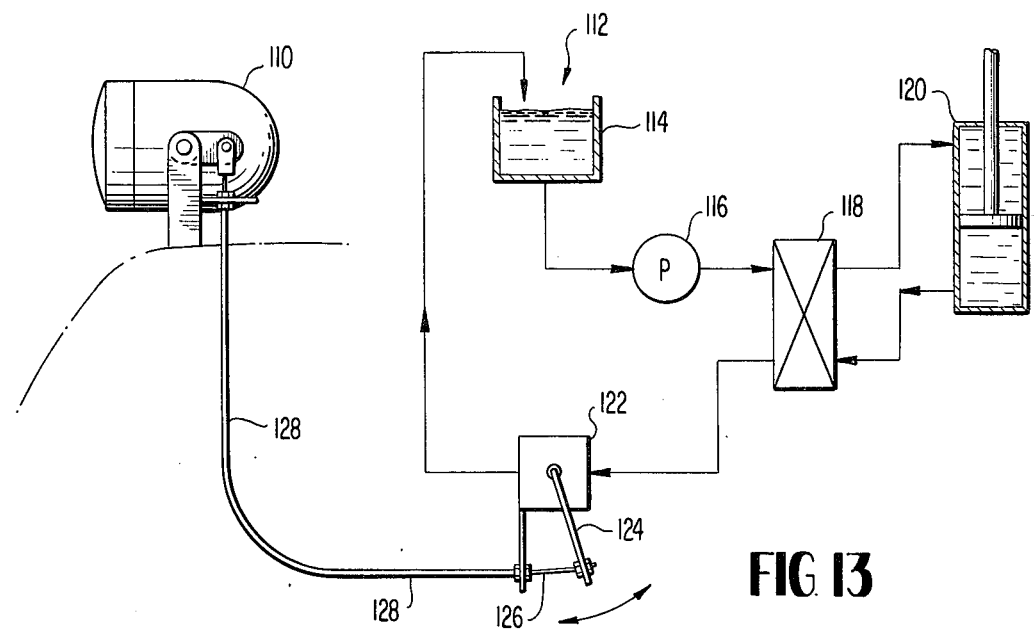
FIG. 13 is a schematic view of another form of vehicle speed sensing mechanism according to the invention.

In FIG. 13 yet another preferred system is disclosed for displacing a vehicle-mounted lamp 110 in response to vehicle speed changes. This system essentially incorporates a hydraulic power steering system 112. The system includes a fluid reservoir 114 and an engine-driven pump 116 for circulating hydraulic fluid from the reservoir 114 to a steering valve 118. The valve 118 operates in a conventional fashion to extend and retract a power steering cylinder 120 that assists steering the vehicle. Fluid from the valve 118, before being returned to the reservoir 114, is directed through a flow sensor 122. Such a sensor can include a pivotal paddle (not shown) which sits in the path of fluid flow. The paddle can be arranged for limited displacement, while being spring-biased counter to the direction of fluid flow. Thus, fluid flowing through the sensor 122 will tend to pivotally displace the paddle against its spring bias. An arm 124 couples the paddle to a flexible cable 126. The cable 126 is slidably mounted within a sheath 128 and is coupled to the lamp 110. As the engine speed increases, the intensity of fluid flow increases accordingly, thereby displacing the arm 124 counterclockwise and the lens portion of the lamp 110 clockwise.

Figure 14:
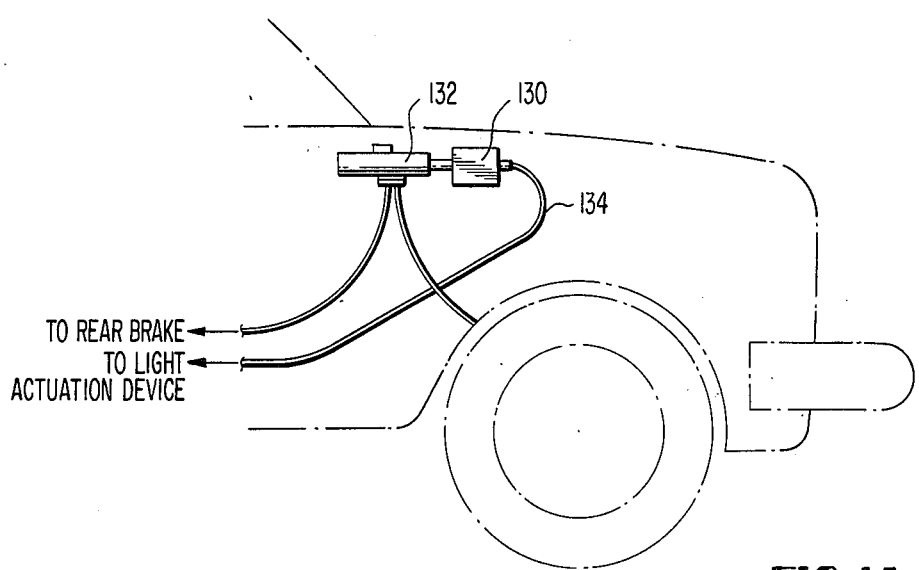
FIG. 14 is a schematic, fragmentary view of a motor vehicle depicting another form of speed responsive mechanism according to the invention.

A further alternative embodiment is shown in FIG. 14 wherein an engine-driven pump 130 is fluidly connected to the master cylinder 132 of a vehicle brake system. The pump 130 is operable to transfer fluid from the master cylinder to a rotatably mounted signal device, such as a lamp, which projects an energy beam from the vehicle. As the engine operates, the pump 130 functions to supply pressurized fluid through a conduit 134 leading to the rotary lamp. The lamp can be spring-biased to resist rotation urged thereon by the pressurized fluid. Greater engine speeds will result in greater force being urged against the lamp to displace the signal beam of energy. A spring which biases the lamp can be pre-adjusted so that at idling conditions of the vehicle engine, the lamp is in its rest condition.

While the use of signal lamps functioning according to the principles of the lamp systems described previously in connection with FIGS. 1 and 4–14 should prove effective, it may be desirable to minimize driver involvement by employing an automatic detector. Such a detector would emit a signal detectable by the senses of the driver.

A detector 140 is illustrated in FIG. 1 and is mounted to the bumper of the trailing vehicle T. The detector 140 may be of any conventional light-sensitive device which activates a warning indicator 142 when the high intensity light beam 14 impinges thereon. The warning indicator 142 may be in the form of a buzzer or blinking light, for example, that is actuated when the detector 140 senses the signal beam from the lead vehicle L.

It will be apparent that when a signal detector is utilized, the signal beam which is emitted from the lead vehicle need not be in the form of a visible light ray, but may be in the form of any suitable source of energy, such as radar pulses, sound waves, infra-red light waves, etc. The transmitter of such energy source would be displaceably mounted in accordance with the teachings previously recited in order to provide automatic adjustment of the location behind the lead vehicle at which the signal beam actuates the detector 140. When the trailing vehicle T intersects the energy beam, the warning indicator is actuated to warn the driver of the trailing vehicle that he is traveling too close.

Figure 3:
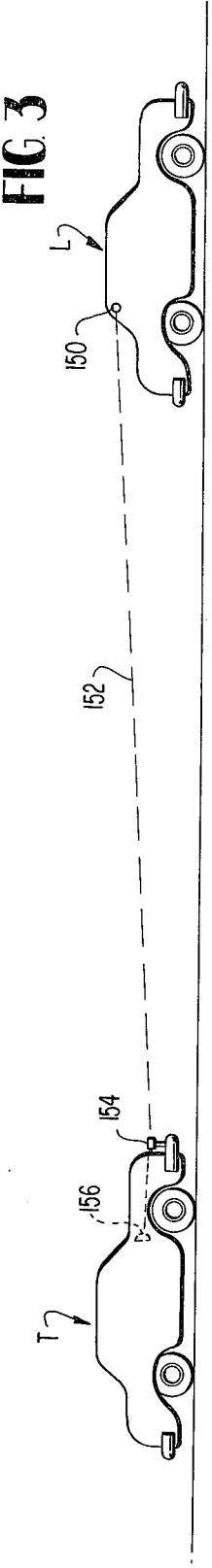
FIG. 3 is a view, similar to FIG. 1, depicting a modified form of the invention.

In this connection, FIG. 3 depicts an embodiment of the invention wherein radar is utilized as the signal energy emitted from the lead vehicle L. A radar-generating mechanism 150 is mounted on the lead vehicle and projects a beam 152 of radar energy rearwardly toward the trailing vehicle T. The radar emitter 150 is displaceable in response to changes in vehicle speed, such as by the mechanisms disclosed in FIGS. 4–14, for example. When the trailing vehicle is positioned where a radar sensor 154 mounted thereon senses the radar beam 152, a warning indicator 156 is actuated to alert the driver of the trailing vehicle. The radar emitting and detecting mechanisms, being of well known types, need not be disclosed in further detail.

In summary, it will be apparent that the present invention provides a number of useful warning signal systems and methods which indicate safe stopping distances to vehicle drivers.

To summarize, in one embodiment of the invention, the signal emitter may be in the form of a lamp which projects a visible light pattern on the roadway. The light may be projected rearwardly to warn a trailing vehicle, and/or forwardly to warn the carrier vehicle. The location of the light pattern is automatically displaced in accordance with varying speeds of the vehicle carrying the emitter. FIGS. 4–14 illustrate preferred systems for effecting this displacement.

A signal detector could be utilized in order to sense the projected beam which, in such case, could be formed of any suitable energy waves such as light, radar, sound, infra-red light, etc. The signal detector would thus activate a warning indicator such as a buzzer or blinking light to warn the driver of the trailing vehicle. The energy beam is displaceable in response to changes in speed of the lead vehicle. FIGS. 4–14 illustrate preferred systems for effecting this displacement.

It is apparent that by virtue of the invention, a clear signal is provided to drivers of tandemly traveling vehicles indicative of a safe stopping distance. There is no need, under the principles disclosed herein, for the driver to discern between different colors. The signal is regulated in accordance with vehicle speed to automatically vary the safe stopping distance.

Moreover, the signal producing system may be easily and economically attached to a conventional motor vehicle.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a vehicle warning system comprising signal means and signal detector means respectively disposed on first and second vehicles traveling in tandem, said signal means comprising:
    signal producing means on said first vehicle for generating a signal beam and including means pivotally mounted on said vehicle for inclinedly directing said signal beam toward a roadway portion so as to be indicative of a safe stopping distance between said vehicles,
    said signal beam being operable to actuate said signal detector means when said vehicles are suitably positioned for said signal beam to be sensed by said signal detector means;
    control means responsive to changes in the speed of said first vehicle for displacing said signal directing means in accordance with changes in vehicle speed;
    the signal beam of said displaced signal directing means being indicative of a safe stopping distance between said vehicles in accordance with the changed speed of said first vehicle;
    said control means comprising air sensing means operably connected to said signal directing means and arranged to be acted upon by ambient air flow to pivot said signal directing means in response to changes in relative air speed caused by changes in speed of said first vehicle.

2. Apparatus according to claim 1 wherein said signal producing means comprises a lamp for emitting a visible light beam in a downwardly inclined rearward direction from said first vehicle.

3. A vehicle visual warning apparatus for visually indicating a safe stopping distance between vehicles traveling forwardly in tandem on a roadway, said visual warning apparatus comprising:
    lamp means on a first vehicle for generating a beam of visible light and including means for inclinedly directing said light beam rearwardly from said first vehicle toward a roadway portion to establish a visible light pattern on the roadway surface behind said first vehicle at a point which defines a safe stopping distance between said first vehicle and a second vehicle which may be traveling forwardly in tandem relative thereto, thereby providing a visual indication of such safe stopping distance to the driver of said second vehicle; and
    control means operably connected to said beam directing means and being responsive to changes in the speed of said first vehicle for displacing said visible beam directing means in accordance with changes in speed of said first vehicle to alter the inclination of the light beam so as to define a new safe stopping distance between said vehicles so that the driver of said second vehicle may know, by observing said light pattern, whether the distance between said vehicles is ample for safe stopping.

4. Apparatus according to claim 3 wherein said first vehicle includes a power train; said lamp means being pivotally mounted on said first vehicle; said control means comprising means operably connected to said power train to sense changes in speed of said first vehicle and pivot said signal directing means in response to a sensed speed change.

5. Apparatus acccording to claim 3 wherein said vehicle includes an engine driven fluid pump for pressurizing fluid as a function of engine speed, said lamp means being pivotally mounted on said first vehicle; said control means comprising means responsive to changes in the pressure of said fluid caused by a change in speed of said first vehicle for pivoting said signal directing means in accordance with the magnitude of the sensed change in speed.

6. Apparatus according to claim 3 wherein said beam directing means comprises a lens portion of said lamp.

7. Apparatus according to claim 3 wherein said beam directing means comprises a reflective element aligned with said lamp means.

8. A vehicle visual warning apparatus for visually indicating a safe stopping distance between vehicles traveling in tandem on a roadway, said visual warning apparatus comprising:
    lamp means on a first vehicle for generating a beam of visible light and including means for inclinedly directing said light beam toward a roadway portion to establish a visible light pattern on the roadway surface at a point which defines a safe stopping distance between said first vehicle and a second vehicle which may be traveling in tandem relative thereto; and control means operably connected to said beam directing means and being responsive to changes in the speed of said first vehicle for displacing said visible beam directing means in accordance with changes in speed of said first vehicle to alter the inclination of the light beam so as to define a new safe stopping distance between said vehicles so that a driver may know, by observing said light pattern, whether the distance between said vehicles is ample for safe stopping;

said beam directing means being pivotally mounted on said first vehicle;

said control means being arranged to pivot said beam directing means in response to a change in speed of said first vehicle to vary the angle of inclination of said signal beam; and said control means comprising air sensing means operably connected to said signal directing means and arranged to be acted upon by ambient air flow to pivot said signal directing means in response to changes in relative air speed caused by said changes in speed of said first vehicle.

9. A method of indicating a safe stopping distance between vehicles traveling forwardly in tandem on a roadway comprising the steps of:

producing a beam of visible light on a first vehicle;

directing said beam of visible light rearwardly from said first vehicle onto a roadway surface portion behind said first vehicle to display a visible pattern of light on the roadway surface at a point which defines a safe stopping distance between said first vehicle and a second vehicle which may be traveling forwardly in tandem therewtih, and thereby providing a visual indication of such safe stopping distance to the driver of said second vehicle;

sensing changes in speed of said first vehicle; and actuating a beam controlling mechanism on said first vehicle in response to such sensed changes to displace said light beam to define a new safe stopping distance between said vehicles so that the driver of said second vehicle may know, by observing said light pattern, whether the distance between said vehicles is ample for safe stopping.

* * * * *